April 19, 1927.
C. SPEAKER
1,624,991
WIRELESS TELEGRAPH AND TELEPHONE SYSTEM
Filed Jan. 29, 1921
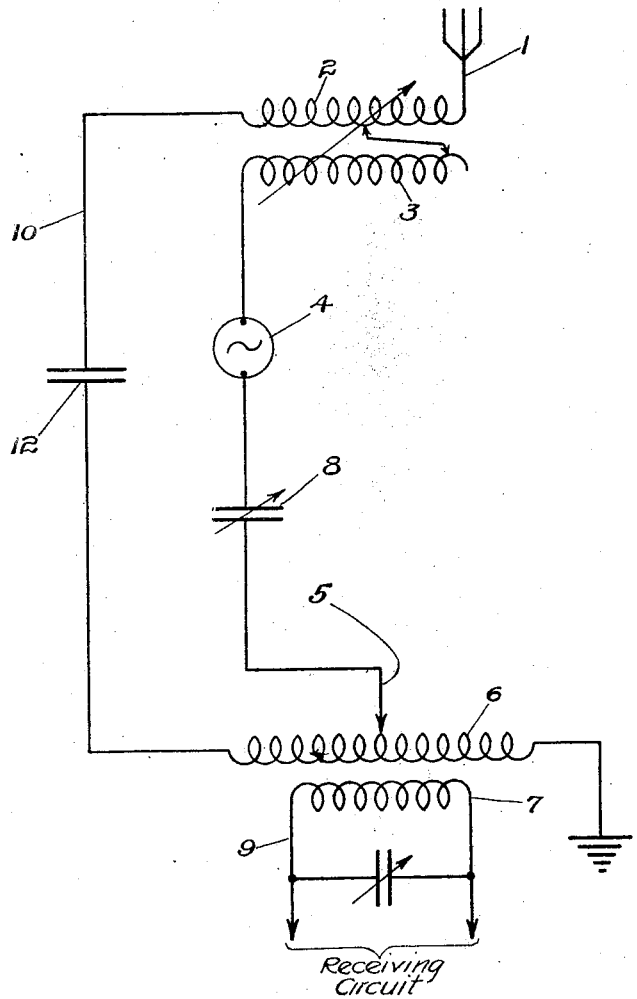
Inventor
Charles Speaker
By
Attorney Patented Apr. 19, 1927.

1,624,991

UNITED STATES PATENT OFFICE.

CHARLES SPEAKER, OF CHERRYDALE, VIRGINIA.

WIRELESS TELEGRAPH AND TELEPHONE SYSTEM.

Application filed January 29, 1921. Serial No. 440,993.

My invention relates generally to wireless telegraph and telephone systems and has for an object to accomplish the simultaneous transmission and reception of wireless signals, and also duplex working in wireless signaling.

A further object of my invention is to provide a bridge method of duplex signaling, in which fewer balancing adjustments are necessary than in bridge methods previously known, whereby the desired balance may be reached more quickly. A bridge system may be defined as one in which the transmitter and receiver are associated by means of a four member net-work or four arm net-work in a way similar to the way that the battery and galvanometer of the usual resistance measuring devices, known as Wheatstone bridges, are associated. The transmitter would correspond to the battery, the receiver to the galvanometer, the antenna to the resistance which is to be measured, and some non-radiating balancing circuit to the variable measuring resistance of the measuring device. The means for associating the antenna and non-radiating balancing circuit would correspond to the ratio arms of the measuring device.

Another advantage of the invention lies in the provision of a system of this character in which duplex or simultaneous working may be accomplished with waves of the same frequency or of different frequencies.

The enormous interference produced in the receiving circuit by the transmitting circuit must be substantially eliminated before duplex or simultaneous working can be accomplished and I do this by a balancing method similar to the Wheatstone bridge.

I will now proceed to describe my invention in detail in connection with the accompanying drawing in which the figure is a diagram of the system embodying my invention.

In the figure numeral 1 refers to the antenna which is to be used for the simultaneous transmission and reception of signals. The antenna is connected through a variable coupling 2, 3 with a conventional transmitter 4. The antenna circuit further comprises a variable connection 5 between the transmitter and the primary coil 6 of the oscillation transformer comprising the coils 6 and 7, and a tuning condenser 8. When desirable an inductance coil may be substituted for the condenser. Any preferred receiving circuit 9 is used with the coil 6, 7.

The balancing circuit 10 includes a condenser 12.

What is sought in this system is to divide the transmitter current between the antenna circuit and the balancing circuit in such a manner that nullification takes place between the effects on the receiver of these two currents as they flow through the primary coil 6.

In my system by varying the variable mutual inductance 2, 3, currents proportional to the parts into which the primary coil 6 is divided are found to flow from the transmitter into the real and artificial antenna circuits, and with the result that there is practically no effect on the receiving circuit and "side tone" is substantially eliminated. In the case of an incoming wave, however, the travel through the receiving primary coil is in one direction only, and hence a signal is produced in the receiving circuit.

In practice, after the antenna circuit has been tuned with the transmitter by means of the tuning member 8, the coupling 2, 3 is varied until the signal from the local transmitting system in the local receiving system is substantially eliminated or at least sufficiently reduced to permit the reception of signals from a distant station.

For purposes of finer receiving adjustment it may be advantageous to make the fixed capacity 12 a variable tuning capacity, but it is to be understood that when such a construction is used, it is for tuning only and is not an adjustment for balancing purposes, it having been clearly set forth above that the only balancing adjustments are the coupling 2, 3 and the variable connection 5.

Having fully described my invention, what I claim as new and desire to secure by Letters Patent is:

1. In a wireless system for the simultaneous transmission and reception of signals, a radiating system including an antenna-ground system, a transmitter for exciting said system, a non-radiating system within the antenna-ground system, a variable mutual inductance associated with the two systems for controlling the relative distribution of transmitter currents therein, a receiver, and an auxiliary coil coupling said receiver to both of said systems so that the transmitter currents therein are neutralized in said receiver.

2. A system for duplex or simultaneously working of wireless telegraphy or telephony including a radiating circuit and a balancing non-radiating circuit, the two circuits being connected through a variable mutual inductance, the non-radiating circuit being provided with a fixed capacity, and a receiver coupled to said circuits through an auxiliary coil having a variable connection to the radiating circuit.

3. A system for the simultaneous transmission and reception of signals comprising a radiating circuit, a transmitter in said circuit, a non-radiating circuit, a variable mutual inductance associating the two circuits on one side of the transmitter, a transformer primary coil associating the two circuits on the other side of the transmitter, and a receiver connected with the secondary of said transformer.

4. A system for the simultaneous transmission and reception of signals, comprising a transmitter, a variable mutual inductance connected to one side of said transmitter, a coil, a variable connection between said coil and the other side of said transmitter, a circuit associating said inductance and said coil across the transmitter, radiating means connected to said inductance, a ground connection to said coil, and a receiver coupled to the coil.

5. In a circuit for the simultaneous transmission and reception of radio signals, an antenna-to-ground circuit including an inductance, a capacity, and a second inductance, a receiver circuit coupled thereto, a transmitter circuit, means for transferring electrical energy from the transmitted circuit to the first mentioned inductance, and means for the transfer of electrical energy from the transmitting circuit to sections of said second inductance for neutralizing the transmitted currents in said receiver circuit.

6. In a circuit for the simultaneous transmission and reception of radio signals, an antenna-to-ground circuit including an inductance, a capacity, and a second inductance, in series, a receiver circuit coupled to said second inductance, a transmitter circuit, variable means for transferring electrical energy from the transmitting circuit to the first mentioned inductance, and variable means for producing opposed fields of variable relative strength in said second inductance for the neutralization of the transmitted currents in said receiver circuit.

CHARLES SPEAKER.